United States Patent
Schon et al.

(10) Patent No.: US 9,207,059 B2
(45) Date of Patent: Dec. 8, 2015

(54) OPERATION OF A COORDINATE MEASURING MACHINE

(75) Inventors: Henning Schon, Aalen (DE); Jochen Burger, Heidenheim (DE); Guenter Grupp, Boehmenkirch (DE); Otto Ruck, Pfahlheim (DE); Eugen Aubele, Boehmenkirch (DE); Ralf Bernhardt, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 352 days.

(21) Appl. No.: 13/642,597

(22) PCT Filed: Apr. 18, 2011

(86) PCT No.: PCT/EP2011/002103
§ 371 (c)(1),
(2), (4) Date: Oct. 22, 2012

(87) PCT Pub. No.: WO2011/131375
PCT Pub. Date: Oct. 27, 2011

(65) Prior Publication Data
US 2013/0041497 A1 Feb. 14, 2013

(30) Foreign Application Priority Data
Apr. 20, 2010 (DE) .......................... 10 2010 015 780

(51) Int. Cl.
*G06F 19/00* (2011.01)
*G01B 5/008* (2006.01)
*G01B 21/04* (2006.01)

(52) U.S. Cl.
CPC .............. *G01B 5/008* (2013.01); *G01B 21/047* (2013.01)

(58) Field of Classification Search
USPC ......... 700/245, 173, 180, 186, 192, 195, 216;
33/503; 702/150–151, 127, 85, 94
See application file for complete search history.

(56) References Cited

U.S. PATENT DOCUMENTS

| | | | | |
|---|---|---|---|---|
| 4,333,238 A | * | 6/1982 | McMurtry | 33/504 |
| 4,882,848 A | * | 11/1989 | Breyer et al. | 33/559 |
| 5,222,034 A | * | 6/1993 | Shelton et al. | 702/152 |
| 6,058,618 A | * | 5/2000 | Hemmelgarn et al. | 33/503 |
| 6,568,242 B2 | | 5/2003 | Nai | |
| 6,967,457 B2 | | 11/2005 | Ludwig | |
| 7,299,108 B2 | | 11/2007 | Geissdorfer et al. | |
| 7,392,692 B2 | | 7/2008 | Noda | |
| 7,752,776 B2 | * | 7/2010 | Farnworth | 36/83 |
| 2005/0055839 A1 | * | 3/2005 | Brenner et al. | 33/559 |
| 2008/0236260 A1 | | 10/2008 | Noda et al. | |
| 2008/0295349 A1 | | 12/2008 | Uhl et al. | |

(Continued)

FOREIGN PATENT DOCUMENTS

| | | |
|---|---|---|
| DE | 19614883 A1 | 10/1997 |
| DE | 199 60 191 A1 | 6/2001 |

(Continued)

*Primary Examiner* — Kidest Bahta
(74) *Attorney, Agent, or Firm* — Laurence Greenberg; Werner Stemer; Ralph Locher

(57) ABSTRACT

A method for operating a coordinate measuring machine or a machine tool. A movement of a machining part is controlled in such a way that, during the movement of the machine part, a predetermined maximum acceleration and/or a predetermined maximum jerk is not exceeded. The maximum acceleration and/or the maximum jerk is varied depending on the position of the machine part and/or depending on the alignment of the machine part.

6 Claims, 3 Drawing Sheets

(56) References Cited

U.S. PATENT DOCUMENTS

Figure 1:
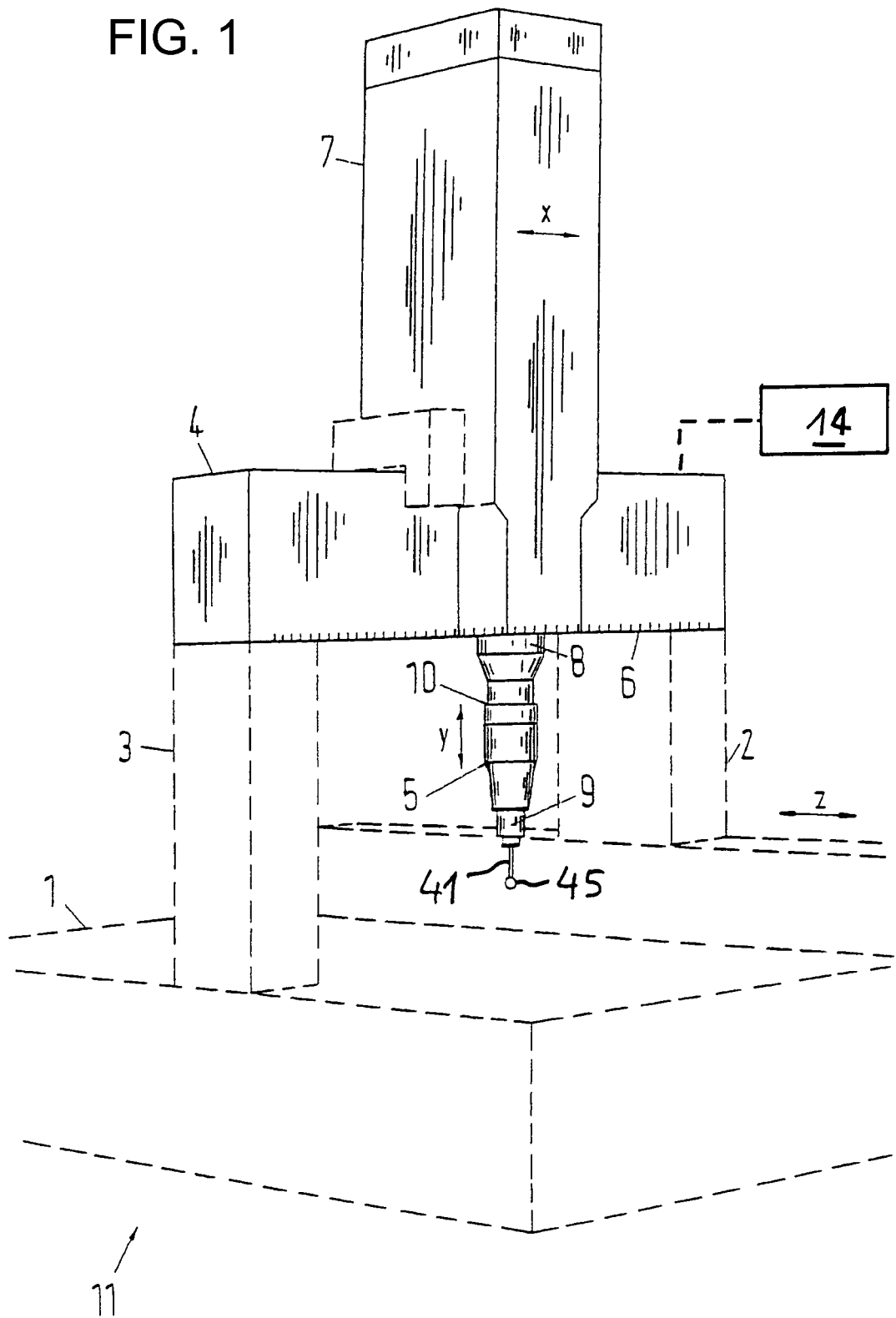

| | | |
|---|---|---|
| 2009/0026995 A1 | 1/2009 | Uhl et al. |
| 2009/0055118 A1 | 2/2009 | McLean et al. |
| 2009/0271997 A1* | 11/2009 | Ruck et al. .................... 33/503 |
| 2010/0100199 A1 | 4/2010 | Ruck |

FOREIGN PATENT DOCUMENTS

| | | |
|---|---|---|
| DE | 10024976 A1 | 7/2001 |
| DE | 102 29 821 A1 | 1/2004 |
| DE | 10321970 A1 | 12/2004 |
| DE | 10 2004 038 416 A1 | 2/2006 |
| DE | 10 2006 003 362 A1 | 7/2007 |
| DE | 10 2006 009 181 A1 | 9/2007 |
| DE | 10 2007 004 423 A1 | 7/2008 |
| DE | 10 2008 011 534 A1 | 9/2009 |
| EP | 0974882 A2 | 1/2000 |
| EP | 14291109 A2 | 6/2004 |

* cited by examiner

OPERATION OF A COORDINATE MEASURING MACHINE

BACKGROUND OF THE INVENTION

Field of the Invention

The invention relates to a method for operating a coordinate measuring machine or a machine tool. The invention also relates to such a machine.

These types of machines have moveable machine parts, in many cases a tool being arranged on an arm of the machine (e.g. a center or a horizontally aligned arm). The tool can be a machining tool for machining a workpiece (in the case of the machine tool) or a sensing tool for sensing the surface of a tool (in the case of a coordinate measuring machine). Instead of the term coordinate measuring machine, the term coordinate measuring instrument is frequently also used. The measuring tool is, for example, a feeler, at the free end of which a sensing body (e.g. a sensing ball) is arranged, by way of which the surface of the workpiece is sensed. In this case, the position of the sensing body, in which it senses the surface of the workpiece, is determined from the measuring system of the machine.

When the tool is moved toward the surface of the workpiece, the movable machine parts, in particular in the region of the tool and of the measuring systems also arranged there where applicable, can begin to oscillate. A possible cause for the oscillations is the drive motors. Another possible cause is the movement itself.

In the case of the coordinate measuring machine, the oscillations impair the measuring accuracy of the position measuring. Consequently, it is worth avoiding such oscillations as much as possible or at least keeping the oscillation amplitude very small.

It is possible to measure the oscillations and/or dynamic variables such as speed or the acceleration of the machine part and, when a predetermined maximum value is exceeded, not to carry out a machining or measuring of the workpiece. For example, the oscillation amplitude can be determined by measuring the acceleration as a function of the time. However, it is also possible to limit the speed or the acceleration of the machine part in the machine control unit, i.e. to control the movement of the machine part such that predetermined maximum values for the speed and/or the acceleration are not exceeded. Suitable maximum values can be established by experimenting with measuring or machining a workpiece.

There is interest in carrying out the measuring or machining of a workpiece in a short time. In this case, the time which is required for the movement of the tool to a desired location on the surface of the workpiece is also to be taken into account. If smaller maximum values are predetermined for the speed and/or the acceleration, correspondingly longer time periods are required for the movement of the tool to the desired location. If, contrary to this, the maximum values are selected to be too high, the measuring result can be falsified or errors can occur in the machining of the workpiece.

BRIEF SUMMARY OF THE INVENTION

It is an object of the present invention to provide a method for operating a coordinate measuring machine or a machine tool as well as such a machine, said method and machine permitting a short operating time without endangering the precision of the operation.

The invention is based on the following fundamental considerations: The oscillation behavior of the machine part (e.g. of the machining tool, the sensing tool and/or the measuring systems) is not only dependent on the dynamics of the movement of the machine part, but is also dependent on the position and/or alignment of the machine part. This dependency is all the more marked, the greater the spatial region in which the machine part is able to be moved.

In particular, in the case of a machine arm on which the tool and/or the measuring systems are arranged, it being possible, when seen from a support of the arm, to extend the arm by various distances, the free end of the arm tends all the more towards oscillations, the further the arm is extended. The arm is, for example, an arm of a so-called horizontal arm instrument, aligned with its longitudinal axis in the horizontal direction or approximately in the horizontal direction, or also other arms such as, for example, the center of a coordinate measuring instrument constructed in an overhead manner. However, the state of the suspension of the arm can also influence the oscillation susceptibility. Thus, for example, the oscillation susceptibility in the case of the center is also dependent on the position in which the center is located on the cross beam which carries said center.

It is consequently proposed to predetermine a value, at least for a dynamic parameter (e.g. the maximum admissible acceleration or the maximum admissible jerk, i.e. the third derivative of the location with respect to time or the first of the acceleration) of the machine or of the machine part, said value varying in dependence on the alignment and/or in dependence on the position of the machine part. For example, a corresponding characteristic line of the dynamic parameter can be predetermined, the characteristic line defining the values of the parameter as a function of the position and/or of the alignment. If the predetermined values of the parameter are dependent not only on one variable (either the position in a linear direction or the alignment of the machine part), instead of a characteristic line it is better to speak of a characteristic field.

It is known to predetermine the dynamic behavior of a coordinate measuring instrument by a set of parameters filed in the control unit. For example, corresponding dynamic parameters, which predetermine the behavior, are maximum values for the speed or the acceleration of a certain machine part. The jerk, in particular, is also of particular significance to the oscillation behavior. Consequently, it is preferred for a maximum value to be predetermined for the jerk, said maximum value varying with the position and/or alignment of the machine part, said maximum value being taken into consideration by the control unit, i.e. the control unit carries out the movement of the machine part such that the maximum value predetermined in each case for the position and/or alignment of the machine part is not exceeded.

In contrast to an overall maximum value predetermined for the entire movement region and region of the possible alignments of the machine part, the invention makes it possible to predetermine higher values of the respective dynamic parameter in regions that are not oscillation-critical or in regions of the position and/or alignment of the machine that are less susceptible to oscillations. Consequently, machining can take place in said regions at higher speeds of the machine part and the higher speed can be maintained longer or can be decreased to lower speeds at a later point. In particular, where the jerk is limited to predetermined maximum values, it is possible to maintain the speed until shortly before the tool contacts the workpiece, to carry out high negative accelerations and nevertheless not to exceed the maximum values of the jerk. As the jerk is the most essential influencing variable for exciting oscillations in the case of such movement operations, strong oscillations are nevertheless avoided.

Said basic concept of the invention can be generalized and be applied not only to dynamic parameters of the machine. Rather an arbitrary parameter which is important to the operation of the control of the machine can vary in dependence on the state of the machine. Such parameters are, for example, control parameters of the control and/or of the drives and trigger threshold values whereby, if they are exceeded, processes of the control and/or of the movement of the machine part are triggered. As an alternative to this or in addition, the maximum value of the parameter or of the parameters can depend not only on the position and/or alignment of the machine part, but on at least one other state variable, such as, for example, the ambient temperature, the type and/or the weight of the tool and/or the measuring systems.

The following, in particular, is proposed: A method for operating a coordinate measuring machine or a machine tool, wherein a movement of a machine part is controlled in such a manner that in the case of the movement of the machine part a predetermined maximum acceleration and/or a predetermined maximum jerk is not exceeded, wherein the maximum acceleration and/or the maximum jerk vary in dependence on the position of the machine part and/or in dependence on the alignment of the machine part.

An example of a variable alignment of the machine part is a feeler of a coordinate measuring instrument which is mounted on a joint such that the alignment of the longitudinal axis of the feeler can be modified. Another example is a machine arm which carries the tool and/or the measuring systems at its free end and the longitudinal axis of which can be aligned in a varying manner.

In particular, the machine part, when seen from a support of the machine part, is positionable at a different spacing, wherein the maximum acceleration and/or the maximum jerk is predetermined such that it varies in dependence on the spacing, for example decreases as the spacing increases. In said cases, the spacing of the machine part from the support is the position on which the maximum value of the dynamic parameter (for example acceleration and/or jerk) is dependent.

In general, the maximum value of the dynamic variable, for example admissible acceleration or admissible jerk, can be predetermined such that it decreases as the oscillation susceptibility increases and vice versa. In many cases, the machine part and/or the machine is all the more susceptible to oscillation, the greater the spacing. However, there are also machines whereby the oscillation susceptibility decreases at least in part regions of the spacing as the spacing increases. Once a minimum of the oscillation susceptibility is reached, the oscillation susceptibility can increase again. An example is a coordinate measuring instrument constructed in an overhead manner where the center carries the measuring systems and the probe at its bottom end. If the center is in its highest position, that is to say not extended downward, a considerable part of the center projects upward beyond the cross beam. Consequently the center is susceptible to oscillation at the smallest spacing between the measuring systems and the probe and the suspension or support on the cross beam. If the center is then extended downward, the oscillation susceptibility initially decreases until the center, with reference to its support on the cross beam, projects approximately equally upward and downward. As it is extended further downward, the oscillation susceptibility increases again.

The method is particularly advantageous when the movement is a movement whereby the machine part is moved closer to a workpiece in order to contact the workpiece, wherein the movement has a movement phase whereby the speed of the machine part decreases. An example of such a movement has been explained above. If the acceleration (in particular with regard to its amount) is limited during the braking phase and/or if the jerk (in particular with regard to its amount) is limited, oscillations can be effectively avoided during such a movement. Such a movement phase is particularly important for the precision of the operation of the machine as oscillations generated during the braking phase can still last until contact with the workpiece is produced. Also the correct position at which the workpiece is to be contacted can possibly not be reached or can only be reached in a non-precise manner when the oscillations are still continuing.

Also proposed is a coordinate measuring machine or machine tool which has a movable machine part and a control unit, the control unit being developed to control a movement of the machine part in such a manner that during the movement of the machine part a predetermined maximum acceleration and/or a predetermined maximum jerk is not exceeded, wherein the maximum acceleration and/or the maximum jerk varies in dependence on the position of the machine part and/or in dependence on the alignment of the machine part.

The advantages and special developments of the machine are not looked at in any more detail here. The advantages and developments correspond to the advantages and developments of the method, as described in this description.

Exemplary embodiments of the invention are now described with reference to the accompanying drawing. The individual figures of the drawing are as follows:

BRIEF DESCRIPTION OF THE SEVERAL
VIEWS OF THE DRAWING

Figure 2:
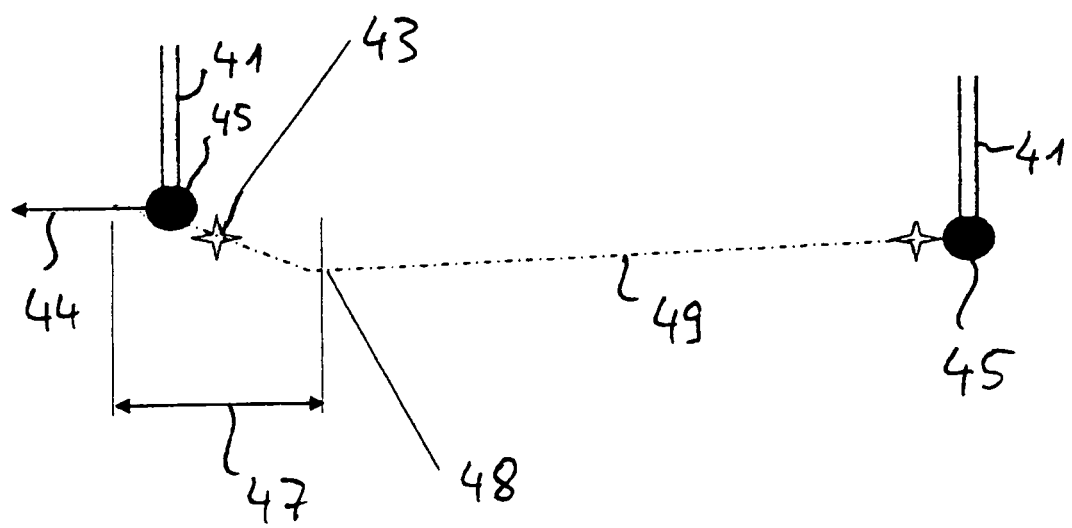
Figure 3:
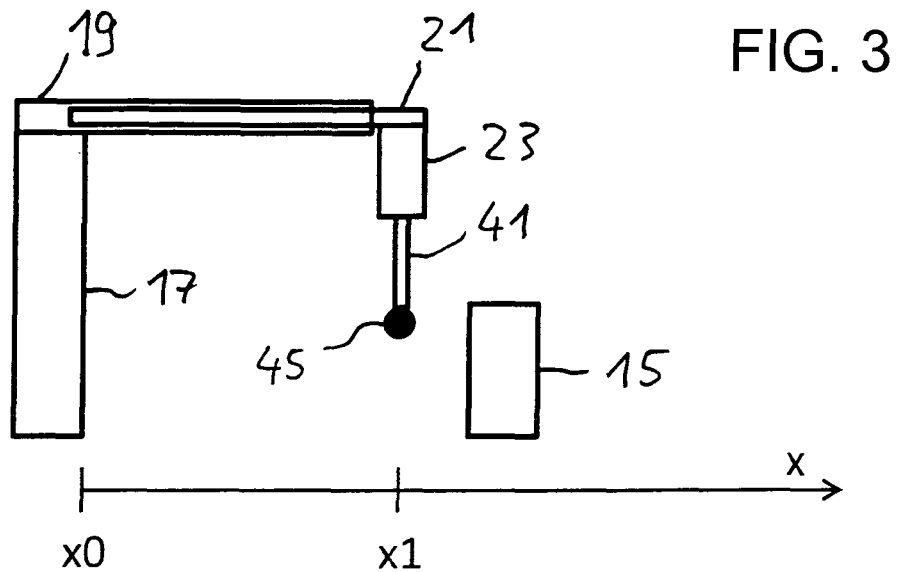
Figure 4:
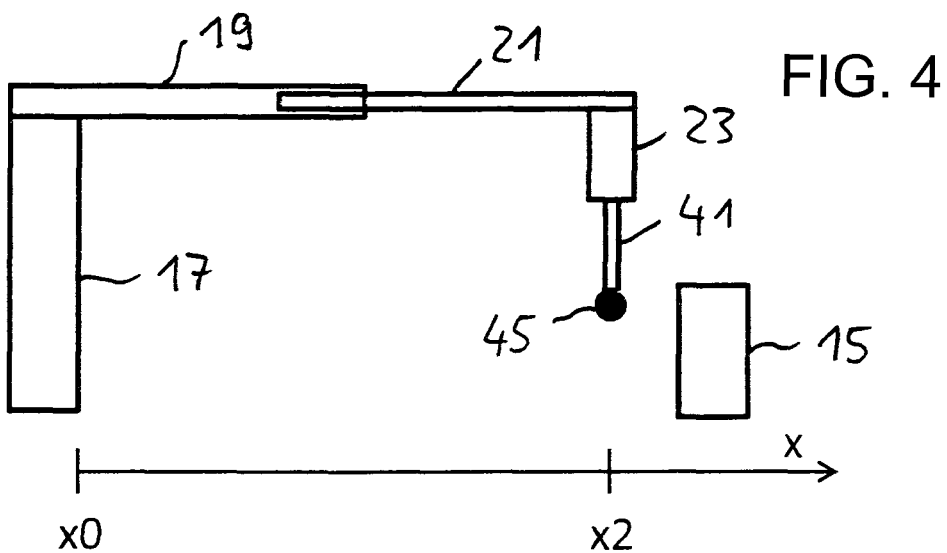
Figure 5:
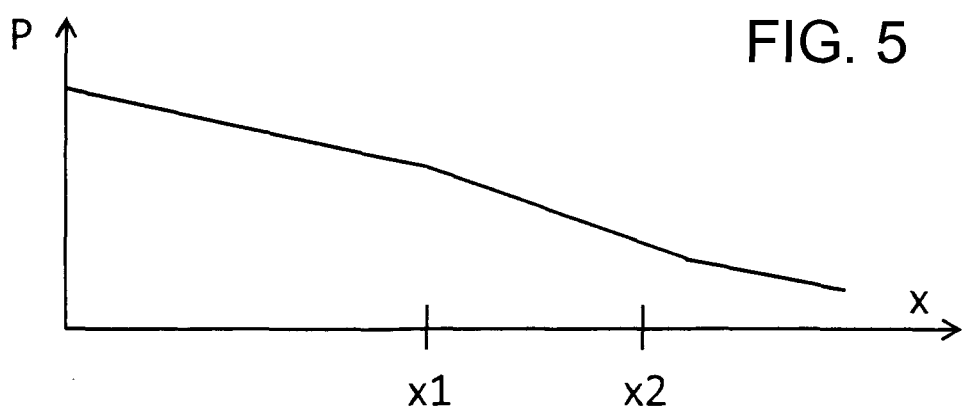

FIG. 1 shows a schematic representation of a coordinate measuring instrument constructed in an overhead manner with a control unit which controls the movement of machine parts of the instrument, FIG. 2 shows a phase of a movement process of a feeler when moving the feeler closer to a workpiece, FIG. 3 shows a schematic representation of an arrangement with a horizontal arm coordinate measuring instrument and a workpiece, FIG. 4 shows the arrangement according to FIG. 3; however, the workpiece is situated at a greater spacing from a stationary base of the coordinate measuring instrument and consequently the horizontal arm is extended further, and FIG. 5 shows a characteristic line which shows the value of a parameter as a function of the position of a machine part.

DESCRIPTION OF THE INVENTION

The coordinate measuring instrument 11 shown in FIG. 1 is of the type constructed in an overhead manner. The gantry is formed by two supports 2, 3 projecting upward and by a cross beam 4 which rests on the supports 2, 3 at its opposite ends. The supports 2, 3 can be moved in the z-direction along a measuring table 1 of the instrument. In addition, the instrument 11 has a center 7 which is movable in the x-direction along the longitudinal axis of the cross beam 4. At the bottom end of the center 7, a holder 8 of the center 7 carries a sensor 5 which is connected to the carrier 8 by means of a detachable coupling 10. The sensor 5 includes the measuring systems of the instrument, by way of which a deflection of a feeler 41 can be measured when said feeler senses a workpiece with its sensing ball 45. The carrier 8 with the parts 5, 41 fastened thereon is movable in the y-direction, wherein the z-direction, the x-direction and y-direction are perpendicular to each other in pairs such that they define the coordinate axes of a Cartesian system of coordinates.

Representative of further possible scales, a scale 6 is arranged extending in the x-direction on the cross beam 4 such that, in dependence on the position of the center 7, a measured value assigned in each case can automatically be read off the scale 6.

The control unit 14 of the instrument 11, which controls the movements of the different machine parts of the instrument 11 in the z-direction, y-direction and x-direction, is shown by a rectangle on the top right-hand side of FIG. 1. The control unit 14 is developed, in particular, to take into consideration during the movement of the feeler 41 the defaults which are predetermined by providing positionally-dependent maximum values of the dynamic variables of the instrument.

In particular, the control unit 14 or the control unit of another coordinate measuring instrument or of a machine tool can read in the corresponding defaults for the maximum values of the parameters from a computer-readable file. A characteristic line and/or a characteristic field is stored in said file for each parameter that is dependent on the operating state (in particular on the position and/or alignment of the tool). The parameter values included in the characteristic line and/or the characteristic field, in this case, are dependent on the respective state variable, in particular on the position and/or alignment of the tool and/or of the measuring systems. For example, it is possible to multiply the respective value of the parameter that is valid in a certain state as an adjustment factor for multiplying with a non-changeable value of the parameter. In this case, the characteristic line or the characteristic field does not directly include the maximum value of the dynamic variable (for example acceleration or jerk), but just the factor for adjusting a predetermined, fixed parameter value.

For example, by providing support positions (e.g. positions along a movement axis of the machine part) and associated adjustment factors, it is possible to define a linear characteristic line in sections. Through linear interpolation between the two next support positions in each case, in dependence on the state variable (e.g. the position with reference to the axis) for the relevant parameter, the state-dependent adjustment factor is determined such that the parameter value is able to change in particular continuously (i.e. steplessly) in dependence on the state. If dependencies on more than one state variable are defined for one parameter, through a suitable algorithm from the individual adjustment factors which are produced from the respective characteristic lines, an overall adjustment factor for multiplication with the predetermined, fixed value of the parameter is determined. However, it is also possible, in particular in the case of dynamic parameters such as the acceleration and the jerk, in each case from the different characteristic lines, to determine an adjustment factor that is valid for the state and to multiply the predetermined, fixed value of the parameter just with that factor which effects the strongest reduction in the predetermined, fixed value.

To prepare the operation of a machine, the respective parameter values for different states of the machine can be determined in an experimental manner such that a certain, desired behavior of the machine is produced. Said parameter values determined in this way can be used, for example, as the above-mentioned support positions for the characteristic lines. The control of the machine is set up in this manner. For example, when setting up a coordinate measuring instrument, by experimenting, the user can determine for individual positions of a sensing head in each case a limit value or several limit values for the dynamic parameters (in particular the maximum value of the acceleration and the maximum value of the jerk) in such a manner that the desired measuring precision is achieved at said positions in the shortest possible measuring time. The pairs determined in this manner from the position of the sensing head and the associated parameter value can then define a value table which corresponds to a corresponding parameter characteristic line. Said data corresponding to the characteristic line or the characteristic lines is stored in one or more files, which the control unit of the machine is able to access. As mentioned, the parameter values can be determined for positions other than the experimentally determined positions by interpolation, in particular linear interpolation. However, other functional interrelationships can be defined between the respective state variables or between the respective state variables and the parameters, the control unit then, during the operation of the machine, determining the parameter value that is valid in each case for an operating state according to the functional interrelationship.

In order to shorten or even to avoid manually establishing at least support positions of parameter characteristic lines by means of a keyboard, the parameter characteristic line or the parameter characteristic lines can be established and/or modified for example by means of a graphic user interface of a computer and by using an input device (such as for example a computer mouse). As a result, time is saved, errors are avoided and the user can perform the input whilst he is already looking at a representation of the characteristic line. The input of parameter values, however, is also possible manually, for example using a keyboard.

During the operation of the machine, the control unit calculates (for example by means of corresponding control software) the respective parameter value or the respective parameter values in dependence on the instantaneous operating state (the state is defined in particular by the position and/or alignment of the tool and/or of the measuring systems). In this case, the control unit can carry out one of the methods described previously (for example linear interpolation).

An advantage of the experimental establishment of parameter values, in particular when support positions are established for characteristic lines or characteristic fields, is that the method can be adapted to the machine or established in a simple manner. For example, parameter sets that already exist can be modified in a simple manner and optimized as a result. Establishing via support positions simplifies the establishing operation as relatively few support positions are already sufficient.

In the case of movement control, it is frequently not sufficient to determine the parameter values that are valid for a certain state only when the state has already been reached. Consequently, it is preferred for the movement sequence to be planned in advance and the parameter values that are valid in each case to be determined beforehand for the planned movement sequence. In this case, the movement planning can be carried out initially without considering the parameter values (such as, for example, the maximum value of the acceleration and/or of the jerk) and the planned movement can be checked after this, but still prior to carrying out the movement, to see whether the conditions predetermined by the parameters are maintained. If the conditions are not maintained, the movement planning can be adapted such that the conditions are maintained. However, it is also possible to take the parameter values into consideration as early as when planning the first movement.

In many operating situations, precise movement planning prior to carrying out the movement is important. For example, a small maximum value for the amount of acceleration can lead to the braking path of a movement of the machine part being longer than expected. This could result in the machine part knocking hard against, for example, the workpiece to be machined or to be measured.

FIG. 2 shows a feeler 41 with a sensing ball 45 at the bottom free end of the feeler 41, it being possible for this to be the feeler according to FIG. 1 or FIGS. 3 and 4. The feeler 41 with its sensing ball 45 is moved along the movement path 49. The sensing ball 45 is moved at a constant high speed along the movement path 49 as far as up to the position 48. A phase of the movement where the sensing ball 45 is braked starts from the position 48. A local region in which no contact between the sensing ball 45 and the workpiece is expected is marked by a double arrow 47. However, seen from the position 48, a workpiece can be situated behind the region 47 in the direction of the arrow 44. Consequently, the movement of the sensing ball 45 is braked in the region 47. The point on the movement path 49 designated by a star 43 marks the location at which the delay (negative acceleration) is modified the quickest with regard to its amount, i.e. at which the jerk reaches its maximum value with regard to its amount. In many cases, the jerk is the deciding factor as to whether and with what amplitude mechanical oscillations are excited.

The braking phase, however, can also be controlled in another manner and as a result can be realized in another manner. As, when seen from the position 48, a workpiece can be situated on the other side of the region 47, braking can already occur with the greatest possible jerk allowed immediately when the region 47 is reached. In this case, the point 43 on the movement path 49, for example, could mark that point where a very small maximum value for the jerk is predetermined, said value being considerably smaller than the maximum value of the jerk which is valid for the point 48 on the movement path 49. This means that the maximum value of the jerk is preferably reduced in a continuous manner on entry into the region 47. If, on entry into the region 47, oscillations should still be excited, they can still be reduced at least in part during the movement in the region 47. It should also be noted that the spacing between the feeler 41 and the support of the machine arm which carries the feeler increases in many cases as the workpiece is approached. For this reason too, the predetermined maximum value for the jerk should decrease over the course of the movement path 49.

FIG. 3 shows a coordinate measuring instrument constructed with a horizontal arm. A fixed base 17 of the instrument carries a horizontal arm which has a carrying element 19 and an element 21 which can be telescoped with reference to the carrier element 19. FIG. 4 shows a position of the element 21 which is extended compared to FIG. 3. The measuring system 23 is fastened to the element 21, to which measuring system, in turn, the feeler 41 with its sensing ball 45 is fastened. In this case, the feeler 41 can be deflectable in relation to the measuring system 23 such that it is deflected when contacting the workpiece 15.

The movement axis is shown at the bottom in FIG. 3 and in FIG. 4, the positional variable of said movement axis being designated by x. A reference point for the movement axis (on the left in FIG. 3 and FIG. 4) is designated by x0. The position of the sensing ball 45 in the state shown in FIG. 3 is designated by x1. The extended position of the sensing ball 45 in FIG. 4 is designated by x2.

FIG. 5 shows a parameter characteristic line. The state variable, once again, is the position of the tool, for example the sensing ball 45 from FIG. 3 and FIG. 4, along a movement axis of the tool. The parameter P can be, for example, the maximum value of the acceleration or of the jerk which is admissible in the case of a movement of the tool. If the characteristic line according to FIG. 5 refers to the situations shown in FIG. 3 and FIG. 4, there is a decrease in the parameter value as the telescopic element 21 and consequently the feeler 41 with its sensing ball 45 are progressively extended. For example, for the case whereby the parameter P is the maximum value of the jerk, the parameter value decreases as the telescopic element 21 is extended. If a preliminary planning of the sensing of the workpiece 15 is preliminarily planned, for example in the position of the workpiece 15 shown in FIG. 4, the telescopic element 21 being extended, the braking operation has to be started in good time similarly as explained by way of FIG. 2 with large admissible jerk values. As a result, oscillations, which would mean the measuring system 23 would measure in a non-precise manner, are avoided.

All in all, not only with reference to the exemplary embodiments described by way of the figures, it is possible using the invention, in operating states with increased oscillation susceptibility, to avoid non-precise measuring results of a coordinate measuring machine being obtained or unwanted or non-precise workpiece machining taking place by a machine tool. In regions of slight oscillation susceptibility, the movement of the respective machine part can be realized with high dynamics, i.e. high acceleration and/or high jerks are admissible. In regions of greater oscillation susceptibility, the dynamics are reduced, i.e. smaller accelerations and/or jerks are allowed. In this way, the movements of the oscillation-susceptible machine parts can be realized in the optimum and shortest possible time.

The invention claimed is:

1. A method of operating a coordinate measuring machine, the method which comprises:
    controlling a movement of a machine part such that, during the movement of the machine part, at least one of a predetermined maximum acceleration or a predetermined maximum jerk is not exceeded;
    one or both of the predetermined maximum acceleration or the predetermined maximum jerk varying within a spatial region in which the machine part can be moved in dependence on at least one of a position of the machine part or an alignment of the machine part, namely according to one of a predetermined characteristic line or a predetermined characteristic field of the maximum acceleration or the maximum jerk, and wherein the predetermined characteristic line or the predetermined characteristic field is used by a machine control during an operation of the machine to define values of the maximum acceleration or of the maximum jerk in dependence on at least one of the position or the alignment of the machine part; and
    smaller values for one or both of the maximum acceleration or the maximum jerk are predetermined in partial regions of a spatial region having a higher susceptibility to oscillations of said machine part compared to partial regions of said spatial region having smaller susceptibility to oscillations of said machine part.

2. The method according to claim 1, wherein the machine part is positionable at different spacings relative to a support of the machine part, and the at least one of the maximum acceleration or the maximum jerk is predetermined to be variable in dependence on the spacing of the machine part from the support.

3. The method according to claim 1, wherein the movement of the machine part is a movement of the machine part approaching a workpiece in order to contact the workpiece, and the movement includes a movement phase during which a speed of movement of the machine part decreases.

4. A coordinate measuring machine or machine tool, comprising:

a movable machine part;

a control unit configured for controlling a movement of said machine part and to assure that, during a movement of said machine part, at least one of a predetermined maximum acceleration or a predetermined maximum jerk is not exceeded, wherein the predetermined maximum acceleration and/or the predetermined maximum jerk varying within a spatial region in which said movable machine part can be moved in dependence on one or both of a position of said machine part or an alignment of said machine part, namely according to one of a predetermined characteristic line or a predetermined characteristic field of the maximum acceleration or the maximum jerk, and wherein the predetermined characteristic line or the predetermined characteristic field is used by said control unit during an operation of the unit to define values of the maximum acceleration or of the maximum jerk in dependence on at least one of the position or the alignment of the machine part; and wherein smaller values are predetermined for the maximum acceleration and/or the maximum jerk in partial regions of a spatial region having a higher susceptibility to oscillations of said machine part compared to partial regions of said spatial region having smaller susceptibility to oscillations of said machine part.

5. The machine according to claim 4, wherein said machine part is supported on a support and said machine part is positionable at different spacings when viewed from said support, and wherein the at least one of the maximum acceleration or the maximum jerk is predetermined to vary in dependence on the respective spacing.

6. The machine according to claim 4, wherein the movement of said machine part is a movement whereby said machine part is moved closer to a workpiece in order to contact the workpiece, and said control unit is configured to control the movement with a movement phase during which the speed of the machine part decreases.

\* \* \* \* \*